United States Patent
Miyamoto et al.

(10) Patent No.: US 7,258,948 B2
(45) Date of Patent: Aug. 21, 2007

(54) NON-AQUEOUS ELECTROLYTE SECONDARY BATTERY AND MANUFACTURING METHODS OF AN ELECTRODE USED THEREIN

(75) Inventors: Yoshikumi Miyamoto, Kyoto (JP); Jun Okazaki, Itano-gun (JP); Ryuji Ohshita, Tokushima (JP); Hitoshi Tanaka, Mihara-gun (JP); Yoshinobu Okumura, Sumoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 397 days.

(21) Appl. No.: 10/781,948

(22) Filed: Feb. 20, 2004

(65) Prior Publication Data

US 2004/0202928 A1    Oct. 14, 2004

(30) Foreign Application Priority Data

Feb. 26, 2003    (JP)    .............................. 2003-049958

(51) Int. Cl.
*H01M 2/16*    (2006.01)
*H01M 4/00*    (2006.01)
*H01M 10/04*   (2006.01)
*H01M 4/82*    (2006.01)

(52) U.S. Cl. ........................ 429/137; 429/94; 429/246; 29/623.5

(58) Field of Classification Search .................. 429/94, 429/128
See application file for complete search history.

(56) References Cited

U.S. PATENT DOCUMENTS 4,610,956 A * 9/1986 Fuchizawa et al. .......... 430/538
5,631,102 A   5/1997 Spillman et al. ............. 429/94
6,387,564 B1* 5/2002 Yamashita et al. .......... 429/132

2003/0224242 A1  12/2003 Kaito et al. ................... 429/94

FOREIGN PATENT DOCUMENTS

JP         09213338 A   *  8/1997
JP         10-2411737       9/1998
JP         2000-030742      1/2000

(Continued)

*Primary Examiner*—Dah-Wei Yuan
*Assistant Examiner*—Karie O'Neill
(74) *Attorney, Agent, or Firm*—Nixon & Vanderhye P.C.

(57) ABSTRACT

To provide a non-aqueous electrolyte secondary battery adapted to prevent an internal short circuit between an positive electrode and a negative electrode caused by the penetration of electrically conductive micro particles through a separator, which occurs when winding up electrodes, and manufacturing methods of an electrode used therein, whereby the non-aqueous electrolyte secondary battery having a coiled electrode assembly is formed through the multilayer winding of an positive electrode 90 having a metallic collector 76 coated with an positive electrode mixture 78 composed of an positive electrode active material that occludes and liberates lithium ions, a negative electrode 86 having a metallic collector 82 coated with a negative electrode mixture 84, composed of a negative electrode active material that occludes and liberates lithium ions, and a separator 72 interposed between the positive electrode and the negative electrode, wherein the positive electrode 90 has an insulating layer 100 formed by means of the dried coating method, the heat seal tape method, or the hot melt coating method on a portion of the metallic collector 76 which is uncoated with the positive electrode mixture 78 and opposed to the negative electrode 86 coated with the negative electrode mixture 84, through the separator 72.

8 Claims, 7 Drawing Sheets

FOREIGN PATENT DOCUMENTS

| | | |
|---|---|---|
| JP | 2000-188115 | 7/2000 |
| JP | 2002-042881 | 2/2002 |
| JP | 2004-164867 | 6/2004 |
| WO | WO98/38688 | 9/1998 |
| WO | WO 02/101854 A2 | 12/2002 |

* cited by examiner

NON-AQUEOUS ELECTROLYTE
SECONDARY BATTERY AND
MANUFACTURING METHODS OF AN
ELECTRODE USED THEREIN

FIELD OF THE INVENTION

The present invention relates to a non-aqueous electrolyte secondary battery and manufacturing methods of an electrode used therein, and more particularly, to a non-aqueous electrolyte secondary battery having an insulating layer for preventing an internal short circuit, and manufacturing methods of an electrode used therein.

BACKGROUND OF THE INVENTION

Because of their continued rise in growth and development, the specification requirements for batteries used in portable electronic devices has increasingly become more rigid. In particular, batteries having a smaller and thinner size, a high capacity and an excellent cycle characteristic, and a stable performance are in demand. In the field of secondary batteries, the lithium non-aqueous electrolyte secondary battery has spawned a lot of interest because it has a higher energy density than other types of batteries, such that its market share in the secondary battery market continues to grow.

The lithium non-aqueous electrolyte secondary battery comprises a negative electrode, which is a strip of negative electrode collector (current collector), such as copper foil, with both surfaces thereof coated with a negative electrode active material mixture; an positive electrode, which is a strip of positive electrode collector, such as aluminum foil, with both surfaces coated with an positive electrode active material mixture; and a separator, such as micro-porous polypropylene film or the like, interposed between the electrodes. The negative electrode and positive electrode are coiled, each insulated from the other by the separator to form a cylinder or an elliptical cylinder, and if the coiled electrode assembly is for a square-shaped battery, it is pressed flat. The negative electrode and positive electrode are then connected at a predetermined part of the electrode, to a negative electrode or positive electrode terminal lead, respectively, and finally, the assembly is housed in a container of a predetermined shape.

In the manufacture of the coiled electrode assembly, the negative electrode and positive electrode are provided by slitting a negative electrode sheet and an positive electrode sheet, respectively, and thereafter coil around a mandrill. However, the cutting of the negative electrode and positive electrode sheets causes burrs to form at the cut ends thereof, that is, the cut ends of the negative electrode collector and the positive electrode collector made of metal, such that when the coiled electrode assembly is pressed flat, the burrs penetrate the separator to electrically couple the negative electrode and positive electrode, producing a short circuit. This short circuit generates an abnormal amount of heat during use of the battery, lowering the capacity thereof, thereby shortening its service life.

Hence, Japanese laid-open Patent Application No.10-241737, paragraphs 18 to 27, paragraphs 40 to 50, FIG. 1, FIG. 5, and FIG. 7, thereof (Related Art Document 1), and Japanese laid-open Patent Application No.2002-42881, right column of page 3 through left column of page 4, and FIG. 8, thereof (Related Art Document 2), for example, disclose non-aqueous electrolyte secondary batteries that determine the position of the negative electrode when the coiled electrode assembly is formed by multilayer-winding of the positive electrode and the negative electrode with a separator interposed there between, and a predetermined insulating tape, whose thickness is greater than the length of burrs on the positive electrode and/or negative electrode that may cause a short circuit with the electrodes when the coiled electrode assembly is formed, and is attached to at least one surface of the negative electrode whose position has been determined, where a short circuit with the positive electrode may occur, wherein the negative electrode is opposed at least to the positive electrode terminal lead. The non-aqueous electrolyte secondary battery electrode and the manufacturing method thereof disclosed in Related Art Document 1 are explained hereinafter with reference to FIG. 8.

FIG. 8 shows the construction of a coiled electrode assembly of the non-aqueous electrolyte secondary battery disclosed in Related Art Document 1. A mandrill 70 holds the folded ends of two separators 72 and 74, which are strips of insulating sheet. An positive electrode collector 76 has an positive electrode active material mixture layer 78 formed on both surfaces of the middle part thereof, and is exposed on both surfaces near the end CT, to which the positive electrode active material mixture layer is not applied. An positive electrode terminal lead 80 is coupled to the exposed part of the positive electrode collector 76. A negative electrode collector 82 has a negative electrode active material mixture layer 84 formed on both surfaces of the middle part thereof, and is exposed on both surfaces near the end CT, to which the negative electrode active material mixture is not applied.

The positive electrode collector 76 is coiled between the mandrill 70 and the separator 72, and the negative electrode collector 82 is coiled while interposed between the two separators 72 and 74. The positive electrode terminal lead 80 is coupled to the surface, facing the mandrill 70 of the positive electrode collector 76 that is opposed to the end CT of the negative electrode collector 82 through the separator 72. That is, part of the positive electrode collector 76 (to which the positive electrode terminal lead 80 is coupled), is opposed to the end CT of the negative electrode collector 82 through the separator 72.

In the above-mentioned construction, any of the following measures may be adopted to prevent a short circuit from occurring between the positive electrode collector 76 and the negative electrode collector 82:

(1) To cover with an insulating material 88, a part of the surface of the positive electrode collector 76 (to which the positive electrode terminal lead 80 is coupled), which is opposed to the end CT of the negative electrode collector 86 through the separator 72.

(2) To cover with an insulating material 92, either surface facing the positive electrode collector 90 or the negative electrode collector 86 of the separator 72 that exists between a part of the positive electrode collector 76, to which the positive electrode terminal lead 80 is connected, and a part of the negative electrode collector 86 which opposes the above-mentioned part of the positive electrode collector 76 and is near the end CT.

(3) To cover with an insulating material 94, a part of the surface of the negative electrode collector 86 that is near the end CT and is opposed to a part of positive electrode collector 76 where the positive electrode terminal lead 80 is coupled, through the separator 72.

In this case, it is sufficient to provide one of the above-mentioned measures. That is, covering the positive electrode collector 76 with insulating material 88 prevents the burrs on the positive electrode terminal lead 80 from damaging the separator 72, while covering the negative electrode collector 82 with insulating material 94 also prevents the burrs on the positive electrode terminal lead 80 from causing a short circuit even if the burrs penetrate the separator 72. Further, covering either surface of the separator 72 with insulating material 92 also produces the same effects as above-mentioned. The application of insulating material 88, 92, or 94 either by means of a resin coating or an insulating adhesive tape will produce the above-described effects. The use of an adhesive insulating tape however is preferred.

SUMMARY OF THE INVENTION

The above-described conventional arts should overcome the problem caused by the formation of burrs during the manufacture of the positive electrode and negative electrode. Still, however, short circuits between the positive electrode and negative electrode have been observed to occur in non-aqueous electrolyte secondary batteries, particularly in square-shaped non-aqueous electrolyte secondary batteries, in which the incidence of burrs has been minimized to the utmost during the manufacturing process.

Upon a review of the causes that give rise to this problem, the inventors have found that short circuits are caused not only by burrs forming on the electrodes, but also by electrically conductive micro particles produced by the chipping-off of active materials or the wear and tear of the manufacturing equipment during the manufacturing process. The micro particles that settle on a part of the positive electrode where the active material is uncoated, that is, where the collector is exposed, penetrate the separator when the coiled electrode assembly is flattened or when charging or discharging the battery, causing the electrodes to expand, producing a short circuit as a result of conduction between the negative electrode and the positive electrode. The inventors also found that short circuits frequently occur at that part of the positive electrode not coated with active material and which is opposed to the part of the negative electrode coated with active material, indicated as item 99 in FIG. 8.

In the case of non-aqueous electrolyte secondary batteries, which is represented by the lithium ion battery, in order to efficiently occlude the lithium ions liberated from the positive electrode active material during charging of the battery, the negative electrode active material layer must lie opposed to the separator while extending beyond the positive electrode active material layer. Accordingly, all non-aqueous electrolyte secondary batteries have the above-described part, where a part of the positive electrode uncoated with active material is opposed to a part of the negative electrode coated with active material. Therefore, it is important to address the problem of the occurrence of short circuits caused by micro particles that settle on such part.

In addition, insulating adhesive tapes, which are conventionally used for preventing short circuits, are known to decrease production efficiency because the adhesive sticks to the manufacturing equipment during the manufacturing process of the battery, particularly during the slitting of electrode sheets and forming coiled electrodes, thereby requiring frequent cleaning of the equipment.

In order to address the above-described problems, the inventors concocted the present invention as shown in FIGS. 1(A) and (B), by which an insulating layer 100, which resides on a part of the positive electrode which is uncoated with positive electrode active material mixture and opposed to a part of the negative electrode coated with negative electrode active material mixture through the dried coating method, the heat seal tape method, or the hot melt coating method. The invention is intended to reduce the possible occurrence of short circuits and increase the production efficiency of non-aqueous electrolyte secondary batteries by reducing the necessity of frequent cleaning of equipment used to manufacture batteries. As shown in FIGS. 1(A) and (B), a structural element identical to that shown in FIG. 8 has been given the same reference numeral, and its detailed explanation will thus be omitted.

The object of the present invention is to provide a non-aqueous electrolyte secondary battery adapted to prevent the occurrence of an internal short circuit between the positive electrode and negative electrode caused by the penetration of electrically conductive micro particles through the separator, and the methods of manufacturing the electrode used therein.

The object of the present invention can be achieved in the following manner. That is, a first embodiment of the present invention provides a non-aqueous electrolyte secondary battery having a coiled electrode assembly formed through the multi layer winding of an positive electrode, which has a metallic collector coated with an positive electrode mixture having an positive electrode active material that occludes and liberates lithium ions; a negative electrode, which has a metallic collector coated with a negative electrode mixture having a negative electrode active material that occludes and liberates lithium ions; and a separator interposed between the positive electrode and the negative electrode, wherein the positive electrode has an insulating layer formed through the dried coating method, the heat seal tape method, or the hot melt coating method, on that part of the metallic collector which is uncoated with the positive electrode mixture and lies opposed to the negative electrode coated with the negative electrode mixture through the separator. In this embodiment, because that part of the positive electrode which is uncoated with the positive electrode mixture and opposed to the negative electrode coated with the negative electrode mixture is covered with an insulating layer, an internal short circuit at such part is prevented, even if electrically conductive micro particles resulting from the chipping-off of active materials or the wear and tear of manufacturing equipment settle on such part.

Furthermore, because the insulating layer contains no adhesive material possessing such quality and degree of adhesiveness at ordinary temperatures as in the case of conventional insulating tape, various problems caused by the adhesive material may be avoided and the creation of the insulating layer can be easily automated.

In this preferred embodiment, the insulating layer has a thickness ranging from equal to or greater than 10 μm to equal to or less than 200 μm. Thickness within this range can effectively prevent electrically conductive micro particles from causing internal short circuits.

To form the insulating layer using the dried coating method, a resin-dissolved solution, such as a solution of polyvinylidene fluoride with N-methyl-pyrrolidone, is used. To form the insulating layer using the hot melt coating method, the resin should mostly be of the rubber type resin, a polyolefin resin such as polyethylene or polypropylene, or an ethylene copolymer such as ethylene vinyl acetate copolymer, with a softening point of 50° C. or higher. To form the insulating layer using the heat seal tape method, the adhesive material (e.g. ethylene vinyl acetate copolymer, ethylene acrylate, or ethylene methacrylic acid or the like) of the heat seal tape to be applied on one surface of the substrate film of polyolefin such as polyethylene or polypropylene, polyester such as polyvinyl chloride and polyethylene terephthalate, polyimide, polyamide, or polyphenylene sulfide, should have extremely low adhesiveness at room temperature, increasing however at 60 to 120° C., preferably at 70 to 100° C.

According to the second embodiment of the present invention, a method for manufacturing a non-aqueous electrolyte secondary battery is provided, comprising the steps of:

(1) forming an insulating layer of a predetermined width and a certain interval on a sheet of metallic collector;
(2) forming an active material mixture layer and an exposed part of collector where the active material mixture layer is not formed, at every other interval by supplying the metallic collector with an active material mixture slurry between two adjacent insulating layers;
(3) drying the active material mixture layer;
(4) roll-pressing the active material mixture layer to make the surface thereof achieve a uniform thickness; and
(5) cutting the sheet at an exposed part of the metallic collector.

According to the third embodiment of the present invention, a method for manufacturing a non-aqueous electrolyte secondary battery is provided, comprising the steps of:

(1) forming an active material mixture layer with a predetermined width and a certain interval by supplying a sheet of metallic collector with active material mixture slurry;
(2) drying the active material mixture layer;
(3) roll-pressing the active material mixture layer to make the surface thereof achieve a uniform thickness;
(4) forming an insulating layer of a predetermined width at each end of the active material mixture layer such that there is no gap between the insulating layer and the active material mixture layer and a part of the metallic collector between two adjacent insulating layers is exposed; and
(5) cutting the sheet at the exposed part of the metallic collector.

The non-aqueous electrolyte secondary battery according to the first embodiment of the present invention is easily produced in accordance with the second and the third embodiments thereof.

BRIEF DESCRIPTION OF THE DRAWINGS

Figs. (A) and (B) of FIG. 1 show an enlarged cross-sectional view of an insulating layer formed in a non-aqueous electrolyte secondary battery according to the present invention.

FIG. 5(A) shows an enlarged view to illustrate the relationship between an insulating layer and an active material mixture layer manufactured in Embodiment 4, while FIG. 5(B) shows an enlarged view to illustrate the relationship between an insulating layer and an active material mixture layer manufactured in Comparative Case 4.

DESCRIPTION OF THE PREFERRED EMBODIMENTS

The embodiments of the present invention are hereinafter described with reference to the accompanying drawings. It should be noted that the embodiments given hereinafter illustrate square non-aqueous electrolyte secondary batteries and the manufacturing methods of electrodes used therein that embody the technical concept of the present invention. However, the application of the present invention is not limited to square non-aqueous electrolyte secondary batteries but is equally applicable to batteries of other shapes such as cylindrical or elliptical cylinder forms.

Embodiments 1, 2 and 3 and Comparative Cases 1 and 2

Figure 1:
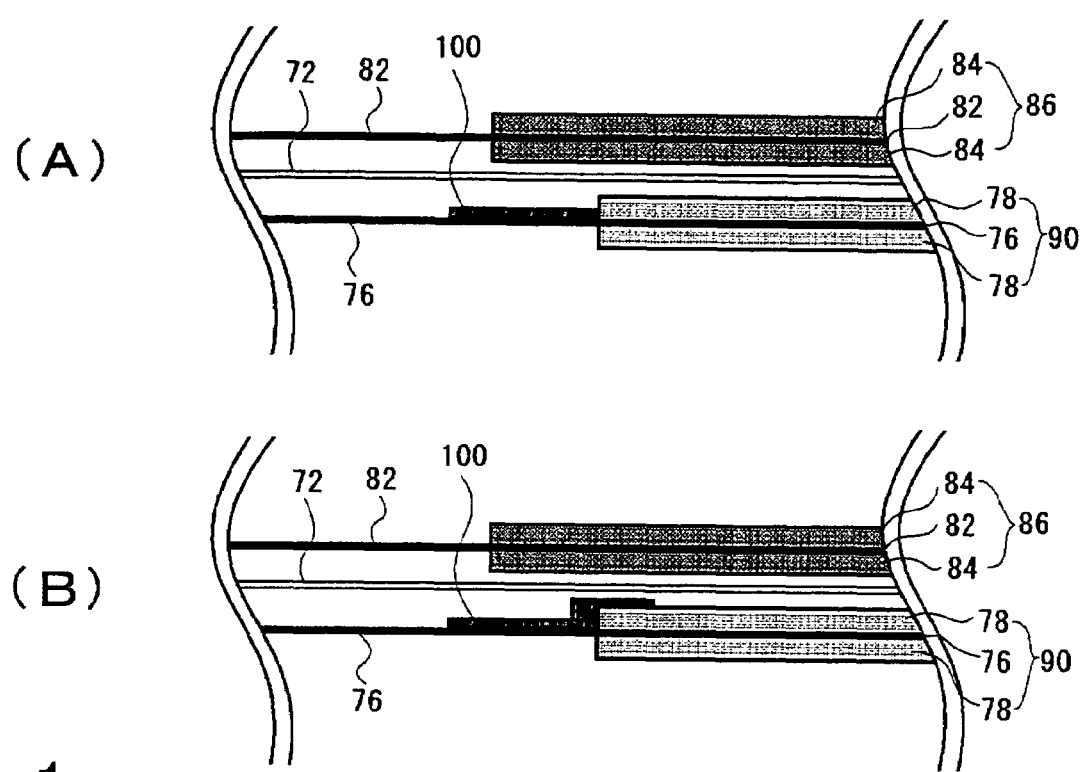
Figure 2:
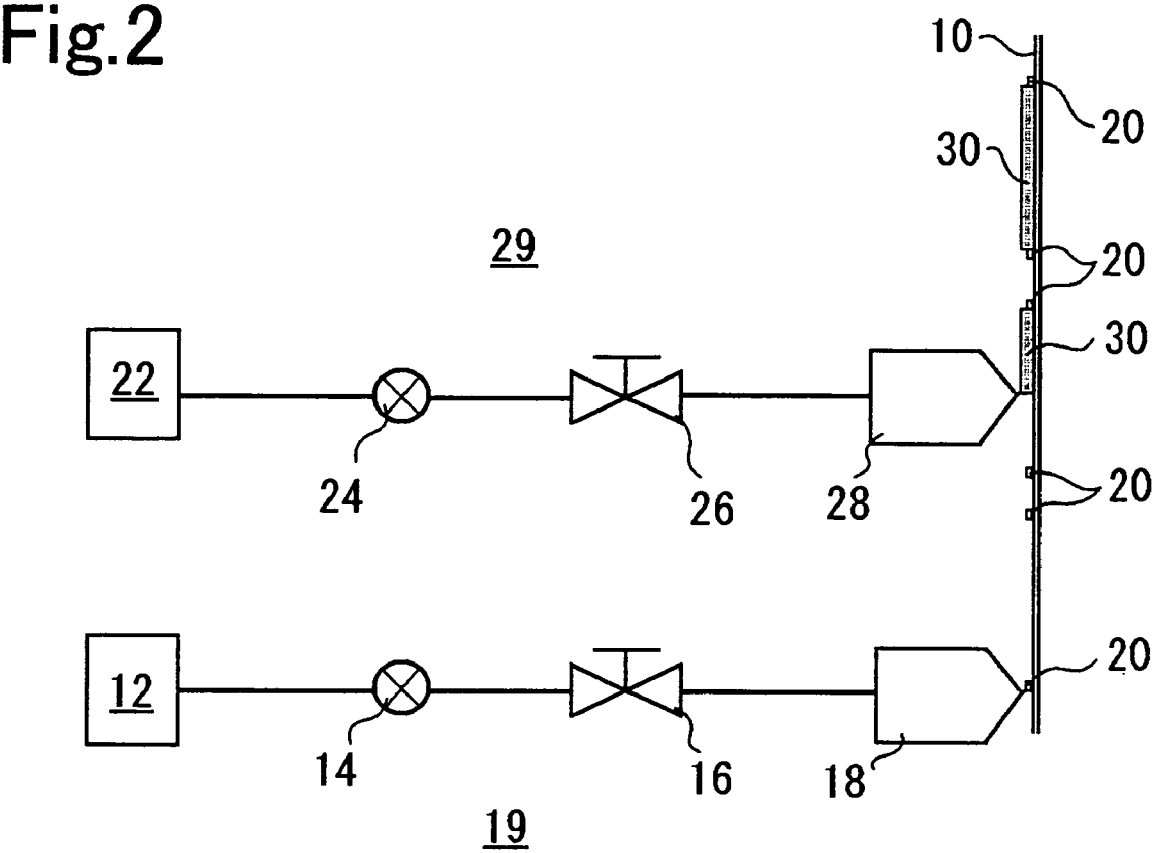
FIG. 2 shows a schematic diagram of equipment for forming an insulating layer by means of the dried coating method used in Embodiments 1, 2 and 3 and Comparative Cases 1 and 2.

In the case of Embodiments 1, 2 and 3 and Comparative Cases 1 and 2, insulating layers are prepared by the dried coating method as shown in FIG. 2. At first, a roll of wide aluminum foil (not shown), normally used as an positive electrode collector (current collector) 10 is provided and made to run continuously from the lower side to the upper side in FIG. 2. The coating resin 12 consists of a solution of N-methyl-pyrrolidone (NMP) dissolving 20% polyvinylidene fluoride (PVdF). An insulating layer 20 is formed by coating the aluminum foil extruded for a predetermined length repeatedly at predetermined intervals with the coating resin 12 by using insulating layer forming means 19 comprising a gear pump 14, a solenoid valve 16, and a die coater 18. The thickness of the insulating layer 20 is adjusted by changing the coating quantity of the resin by way of controlling the gear pump 14 to make five different samples of positive electrode: 5 μm (Comparative Case 1), 10 μm (Embodiment 1), 50 μm (Embodiment 2), 180 μm (Embodiment 3), and 300 μm (Comparative Case 2). The coating length is kept to a predetermined constant value by electrically controlling the solenoid valve 16 using a position sensor (not shown).

Figure 3:
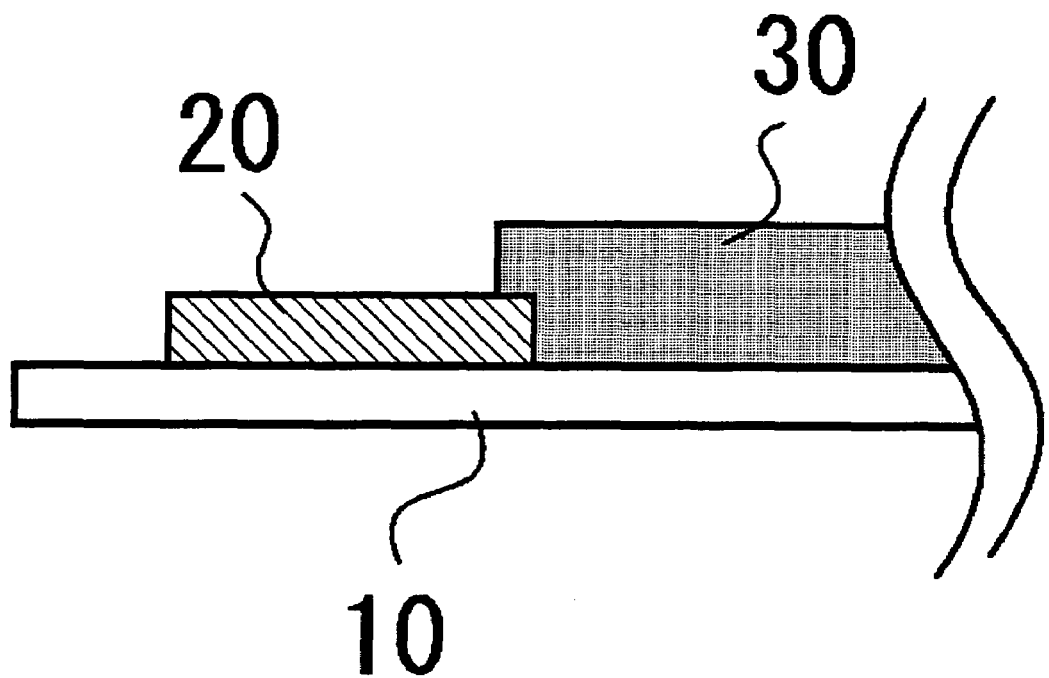
FIG. 3 shows an enlarged view to illustrate the relationship between an insulating layer and an active material mixture layer manufactured in Embodiments 1, 2 and 3 and Comparative Cases 1 and 2.

Then the positive electrode mixture slurry 22 is similarly extruded to coat the foil on every other interval between two adjacent strips of insulating layer 20 using an positive electrode active material mixture layer forming means 29 comprising a gear pump 24, a solenoid valve 26, and a die coater 28. Then the positive electrode mixture slurry is heated to a temperature of 120° C. to cause the moisture and NMP to evaporate. The dried mixture is thereafter compacted through the usual method of using a roll press to form an positive electrode active material mixture layer 30, and then the layer is cut by a slitter to a predetermined width to provide positive electrodes. As shown in FIG. 3, the positive electrode active material mixture layer 30 has a uniform thickness throughout its entire length although it covers a part of the insulating layer 20 at the boundary between the insulating layer 20 and the positive electrode active material mixture layer 30.

As shown in FIGS. 2 and 3, it should be noted that the insulating layer and the positive electrode active material mixture layer are also formed on the other surface of the positive electrode collector 10 using similar insulating layer forming means and positive electrode active material mixture layer forming means, although the layers and the forming means are not shown in the drawings.

Using five kinds of positive electrodes and the positive electrode for Comparative Case 3 which does not have the insulating layer 20, sealed square lithium secondary batteries were produced under the usual method by winding up the positive electrode with the separator and the negative electrode, with each electrode adjusted in length so that they could be housed in a container for a sealed square lithium secondary battery with a nominal capacity of 600 mAh. 1000 sealed square lithium secondary batteries were made from each of the following samples: A (Comparative Case 1), B (Embodiment 1), C (Embodiment 2), D (Embodiment 3), E (Comparative Case 2), and H (Comparative Case 3). The average initial discharge capacity value for each of batteries A through E was normalized with the charge and discharge capacity of battery H (Comparative Case 3) which did not have the insulating layer 20. The relative values are shown in TABLE 1.

Further, in order to confirm the advantage of the present invention, an accelerated short circuit test was carried out by storing the batteries at a temperature of 40° C. for three months after charging the prepared batteries to 4.5V. The results of this test are shown in TABLE 1, where "O" on the Internal Short Circuit column denotes that not a single battery out of 1000 units had a short circuit, and "X" denotes that one or more batteries had a short circuit.

Embodiment 4 and Comparative Case 4

Figure 4:
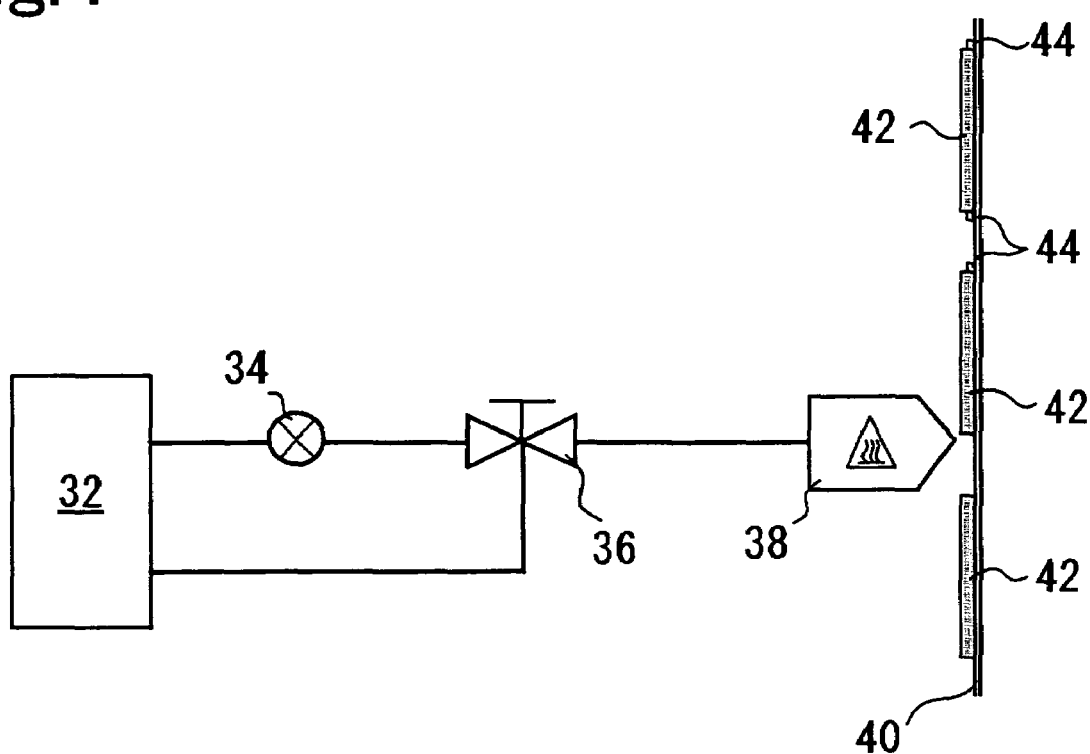
FIG. 4 shows a schematic diagram of equipment for forming an insulating layer by means of the hot melt coating method used in Embodiment 4.
Figure 5:
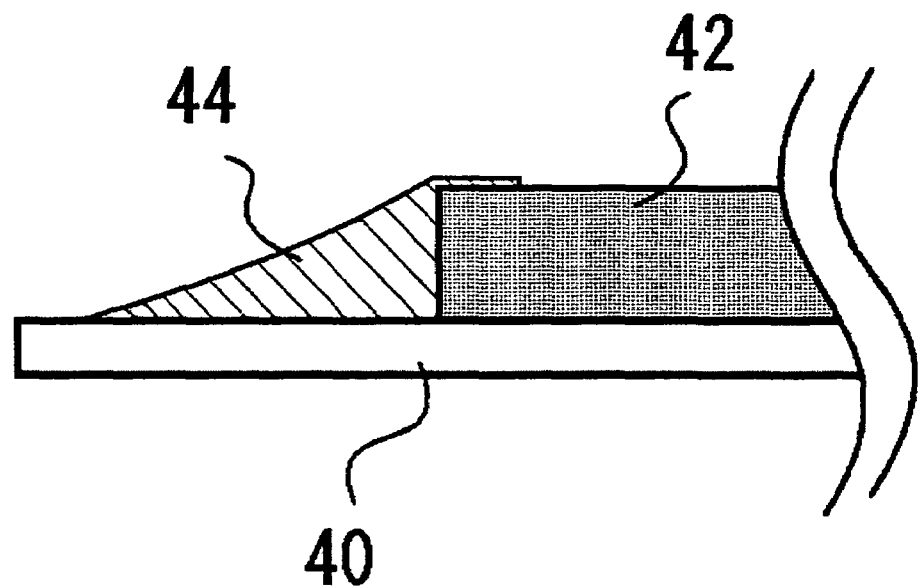
Figure 5:
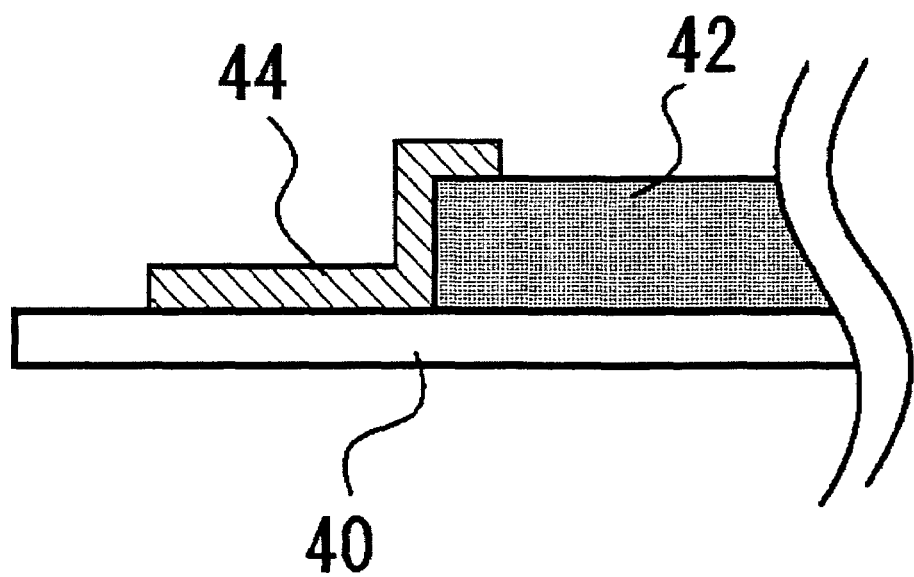

In the case of Embodiment 4, coating resin for the insulating layer was applied by means of the hot melt coating method to manufacture positive electrodes. The coating resin was prepared by melting and mixing polypropylene (95%) and SUITEN-TENPERU (brand name) resin (5%) at 200° C. Next, as shown in FIG. 4, the coating resin was melted in a heat melting machine 32 heated to a temperature of 180° C., and then extruded through a solenoid change-over valve 36 and a heated die slot 38, with coating quantity controlled by a gear pump 34 to form an insulating layer 44, both ends of an positive electrode active material mixture layer 42 which had already been formed for a predetermined length, and a certain interval on an positive electrode collector 40. The coating position and length were kept constant by electrically controlling the solenoid change-over valve 36 using a position sensor (not shown). The insulating layer 44 was formed with a slope shape, with a part of it spreading over the positive electrode active material mixture layer 42, as shown in FIG. 5(A). However, the consistency of the insulating layer spread over the positive electrode active material mixture layer 42 was very thin.

With respect to Comparative Case 4, a conventional adhesive insulating tape 44 (50 μm thick) was applied to a part of the tape covering the positive electrode active material mixture layer, as shown in FIG. 5(B). The length of that part of the tape covering the mixture layer was made equal to the length of the coating resin covering the mixture layer referred to in Embodiment 4. Using each of the positive electrodes thus provided, sealed square lithium secondary batteries were manufactured and tested in a manner similar to those referred to in Embodiments 1, 2 and 3. The results are shown in TABLE 1.

Embodiment 5

Figure 6:
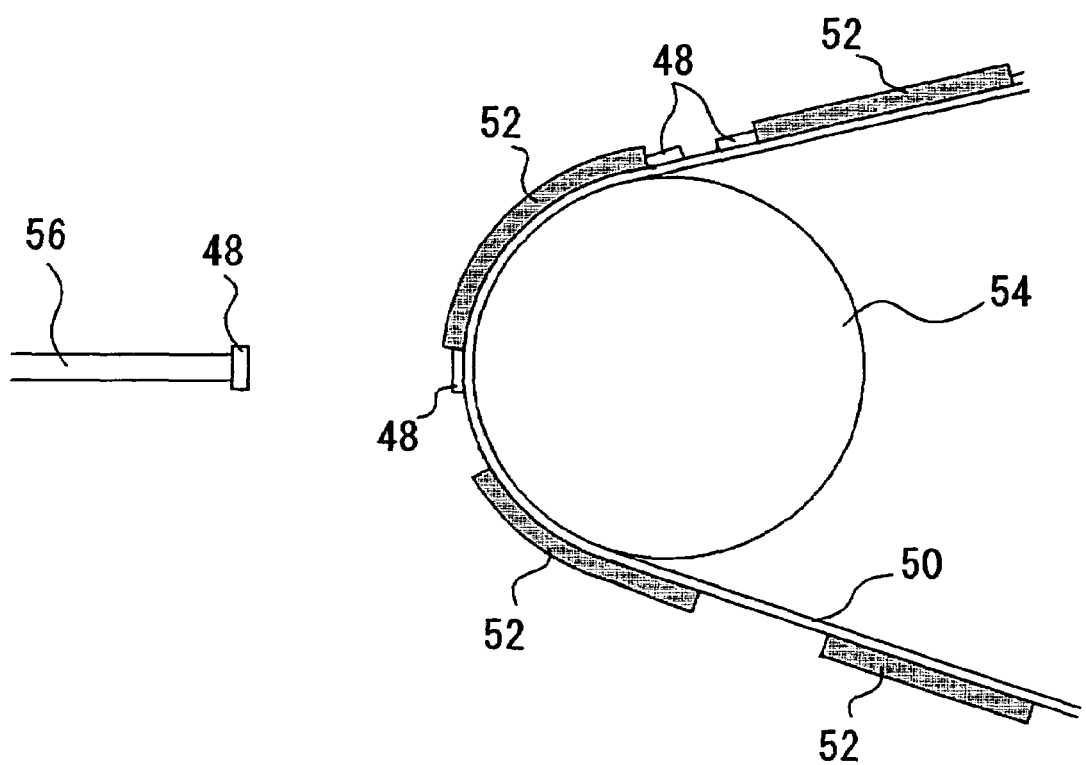
FIG. 6 shows a schematic diagram of equipment for forming an insulating layer by means of the heat seal tape method used in Embodiment 5.
Figure 7:
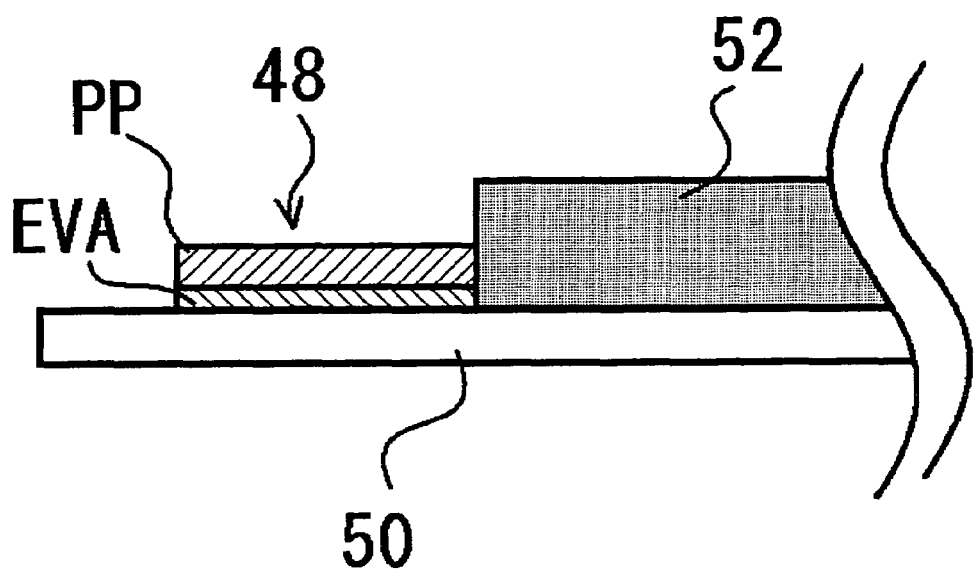
FIG. 7 shows an enlarged view to illustrate the relationship between an insulating layer and an active material mixture layer manufactured in Embodiment 5.
Figure 8:
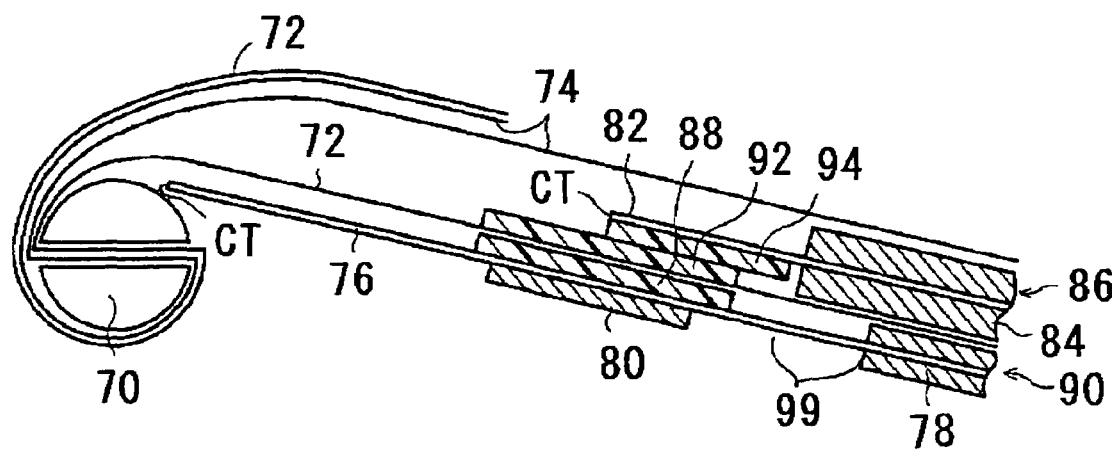
FIG. 8 shows a construction of a coiled electrode assembly of a conventional non-aqueous electrolyte secondary battery.

With respect to Embodiment 5, a heat seal tape 48, composed of thermoplastic resin of polypropylene (PP) insulating tape for the top and ethylene vinyl acetate copolymer (EVA) for the bottom was used to produce the positive electrode sheet referred to in Embodiment 4. That is, as shown in FIG. 6, the positive electrode collector 50 upon which an positive electrode active material mixture layer 52 of a predetermined length and thickness, was continuously made to run on a heated roll 54, and a heat seal tape 48, cut to a predetermined length and held by a tape holder 56 was attached automatically to both ends of the positive electrode active material mixture layer 52 using a position sensor (not shown). In this process, because the heat seal tape is hard, it can be placed right against each end of the positive electrode active material mixture layer 52 without a gap or an overlap. Then with each of the positive electrodes thus obtained, sealed square lithium secondary batteries were manufactured and tested in a manner similar to those referred to in Embodiments 1, 2 and 3. The results are shown in TABLE 1.

TABLE 1

| | | Insulating Layer Thickness (μm) | Discharge Capacity (Relative Value) | Cleaning of Slitter Blade | Internal Short Circuit |
|---|---|---|---|---|---|
| Dried Coating Method | A (Comparative Case 1) | 5 | 1.00 | No | X |
| | B (Embodiment 1) | 10 | 1.00 | No | O |
| | C (Embodiment 2) | 50 | 0.98 | No | O |
| | D (Embodiment 3) | 180 | 0.96 | No | O |
| | E (Comparative Case 2) | 300 | 0.85 | No | O |
| Hot Melt Coating Method | F (Embodiment 4) | 50 | 1.00 | No | O |
| Heat Seal Tape Method | G (Embodiment 5) | 50 | 0.97 | No | O |
| No Insulating Layer | H (Comparative Case 3) | — | 1.00 | No | X |
| Conventional Art | I (Comparative Case 4) | Tape 50 | 0.96 | Frequent Cleaning | O |

From the results indicated in TABLE 1, the following points can be derived. That is, in Embodiment 1, the insulating layer was so thin at 5 μm that there was no decrease in initial discharge capacity in comparison with that of Comparative Case 3 which had no insulating layer, but 2 out of 1000 samples had an internal short circuit during the accelerated internal short circuit test. In Comparative Case 2, a decrease of initial discharge capacity occurred probably because the insulating layer was so thick at 300 μm, and none of the samples showed the occurrence of an internal short circuit during the accelerated internal short circuit test. Based on these results and interpolation made as required, the appropriate thickness of the insulating layer is 10 to 200 μm, but preferably 10 to 100 μm.

Furthermore, the conventional art of using insulating tape represented by Comparative Case 4 could effectively prevent the occurrence of internal short circuits, but frequent cleaning of the slitter blade is required during the slitting stage of the electrode sheet, because the adhesive material adheres to the blade, lowering cutting accuracy. On the other hand, in the dried coating method, the hot melt coating method, and the heal seal tape method, cutting accuracy can be maintained without need of cleaning the slitter blade, because no adhesive material adheres to the blade.

Although the above-described Embodiments 1, 2 and 3 utilized the dried coating method to form the insulating layer, it may be obvious to those skilled in the art that the hot melt coating method used in Embodiment 4 and the heat seal tape method used in Embodiment 5 are equally applicable.

As described above, the present invention provides a non-aqueous electrolyte secondary battery adapted to effectively prevent the occurrence of an internal short circuit between the positive electrode and the negative electrode caused by the penetration of electrically conductive micro particles through the separator, which occurs when forming the coiled electrode assembly.

What is claimed is:

1. A non-aqueous electrolyte secondary battery having a coiled electrode assembly made through the multilayer-winding of:
    an positive electrode having a metallic collector coated with an positive electrode mixture, composed of an positive electrode active material that occludes and liberates lithium ions;
    a negative electrode having a metallic collector coated with a negative electrode mixture, composed of a negative electrode active material that occludes and liberates lithium ions; and
    a separator interposed between the positive electrode and the negative electrode,
wherein the positive electrode has an insulating layer of a heat seal tape adhered with an adhesive material which has increased adhesiveness at 60 to 120° C. and extremely low adhesiveness at room temperature or a hot melt coated resin, with a softening point of 50° C. or higher on a portion of the metallic collector uncoated with the positive electrode mixture and opposed to a part of the negative electrode coated with the negative electrode mixture through the separator which uses a microporous film.

2. The non-aqueous electrolyte secondary battery according to claim 1, wherein the insulating layer has a thickness ranging from equal to or greater than 10 μm to equal to or less than 200 μm.

3. The non-aqueous electrolyte secondary battery according to claim 1, wherein the insulating layer also covers a part of the positive electrode mixture coating.

4. The non-aqueous electrolyte secondary battery according to claim 1, wherein the insulating layer has a thickness ranging from equal to or greater than 10 μm to equal to or less than 200 μm and also covers a part of the positive electrode mixture coating.

5. The non-aqueous electrolyte secondary battery according to claim 1, wherein the positive electrode mixture layer covers a part of the insulating layer, with the entire surface of the positive electrode mixture layer being of uniform thickness.

6. The non-aqueous electrolyte secondary battery according to claim 1, wherein the insulating layer has a thickness ranging from equal to or greater than 10 μm to equal to or less than 200 μm, and the positive electrode mixture layer covers a part of the insulating layer, with the entire surface of the positive electrode mixture layer being of uniform thickness.

7. The non-aqueous electrolyte secondary battery according to claim 1, wherein the resin used for the hot melt coating is selected from the group consisting of polyethylene, polypropylene and ethylene vinyl acetate copolymer.

8. The non-aqueous electrolyte secondary battery according to claim 1, wherein said adhesive material which increases adhesiveness at 60 to 120° C. is ethylene vinyl acetate copolymer, ethylene acrylate, or ethylene methacrylic acid.

* * * * *